Figure 1:
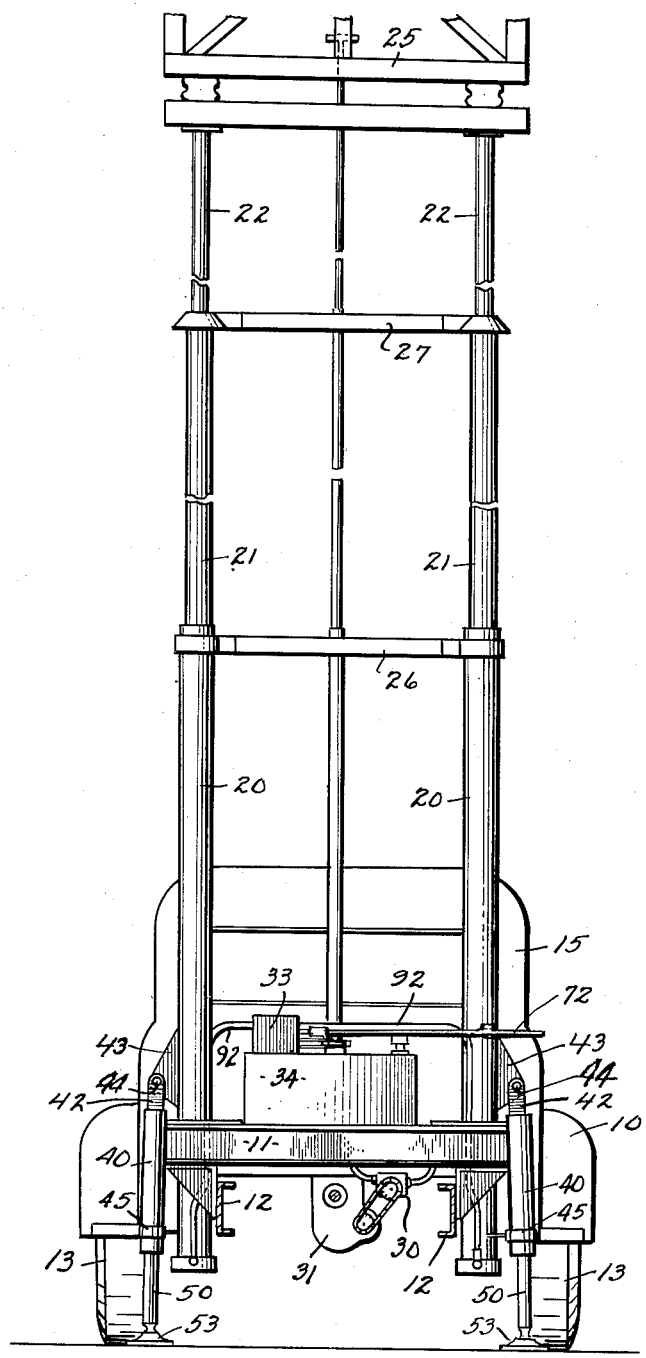

July 19, 1955

R. O. BALOGH 2,713,402

TOWER VEHICLE LEVELING DEVICE

Filed July 15, 1949

3 Sheets-Sheet 1

INVENTOR.
ROY O. BALOGH
BY
Bates, Teare, & McKean
Attorneys

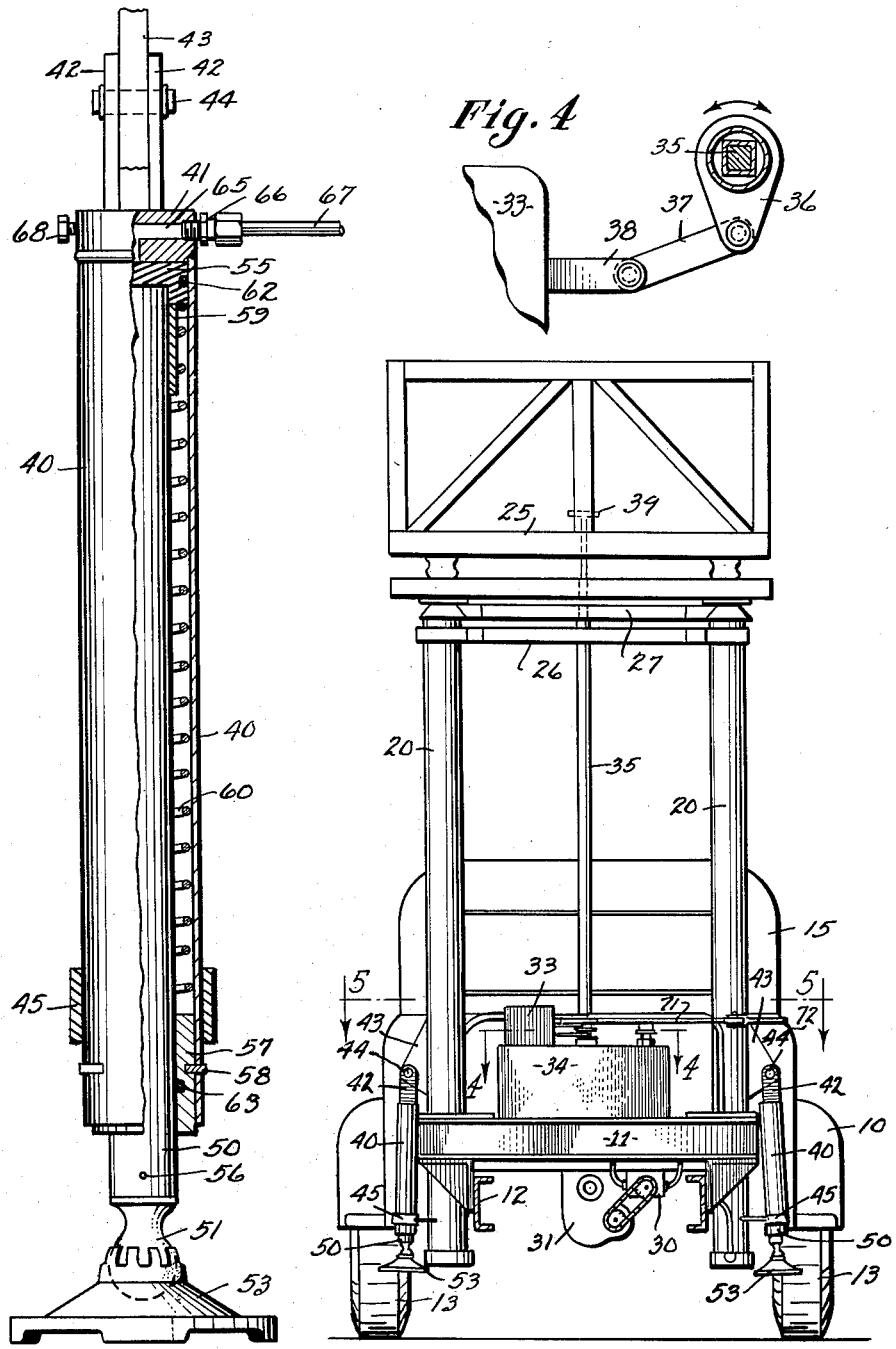

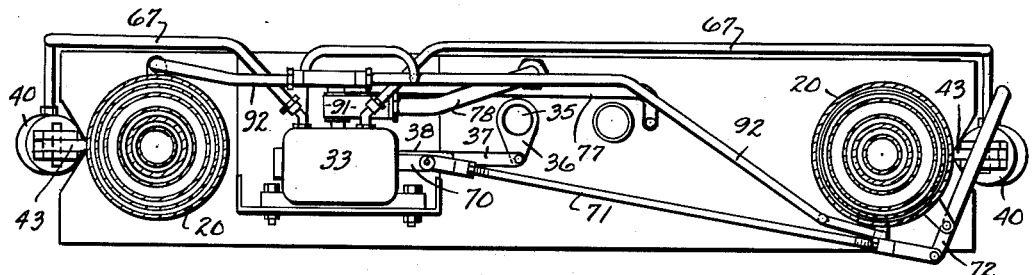
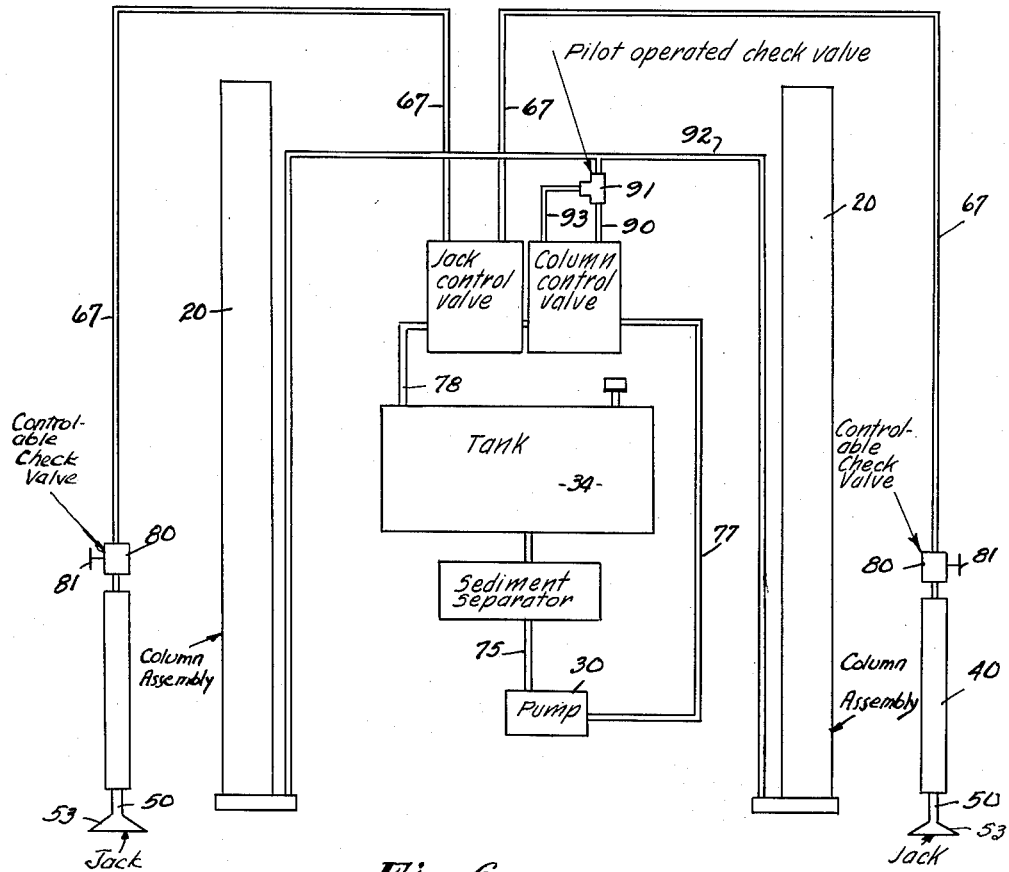

United States Patent Office 2,713,402
Patented July 19, 1955

2,713,402

TOWER VEHICLE LEVELING DEVICE

Roy O. Balogh, Cleveland, Ohio, assignor, by mesne assignments, to McCabe-Powers Auto Body Co., St. Louis, Mo., a corporation of Missouri Application July 15, 1949, Serial No. 104,855

2 Claims. (Cl. 189—14)

This invention relates to mechanism mounted on a vehicle adapted to be readily operated to level the platform when the ground on which the vehicle stands is inclined toward one side or the other. The invention is especially useful on a utility vehicle having an upwardly extending tower, where it is important that the worker's platform at the top of the tower be maintained in a horizontal position directly over the wheel base of the vehicle.

I have provided the vehicle with a pair of hydraulic jacks, one on each side, so arranged that they may be carried in idle position during the travel of the vehicle but whenever desired either or both of them may be extended downwardly to engage the ground and thereafter actuated to elevate one side or the other of the vehicle frame to maintain the tower carried by the vehicle in a substantially vertical position.

My invention is hereinafter more fully explained in connection with a preferred embodiment shown in the drawings.

In the drawings, Fig. 1 is a rear elevation of the forward portion of a tower vehicle equipped with my leveling device, this view being transversely sectioned between the front and rear wheels and showing the tower extended and the leveling members engaging the ground; Fig. 2 is a similar rear elevation of the vehicle with the tower lowered the maximum amount and the jacks elevated, this being the condition for travel of the vehicle; Fig. 3 is an enlarged sectional elevation of either of the hydraulic jacks; Fig. 4 is a detail of the valve operating mechanism used in controlling the extension of the tower, this view being a section on the line 4—4 on Fig. 2; Fig. 5 is a horizontal section through the two uprights of the tower showing the valve-controlling means for raising the tower and for lowering the jacks, the plane of the section being indicated by the line 5—5 on Fig. 2; Fig. 6 is a diagram illustrating the operation of the embodiment shown in the other figures.

In Figs. 1 and 2, 10 indicates a utility vehicle having a platform 11 carried by a suitable longitudinal frame member 12, the whole being supported by four wheels of which the front two are indicated at 13. The tower includes a pair of telescopic extendable tubular devices transversely aligned and of which the outermost tubes designated 20 are stationarily secured to the vehicle frame. In front of them may be an operator's cab 15.

Each tubular member of the tower may comprise several tubes telescoping within each other. For instance, I have indicated movable tubes 21 telescoping into the stationary tubes 20, and movable tubes 22 telescoping into the tubes 21. The tubes 22 carry at their upper ends a suitable worker's platform 25. Various cross members as 26, 27 may brace the two telescopic tubular members.

The details of the interior of the tubes comprising the extensible tower form no part of the present invention and hence need not be particularly described. It is deemed to be sufficient to explain that the inner tubes within the outermost tubular members 20 may be raised by hydraulic means to the limit allowed by the outermost set of movable tubes, and then the tube or tubes within such extended movable tubes may be raised with reference to them. The raising is effected by hydraulic pressure furnished by a pump on the vehicle operating to inject liquid under pressure beneath the tubes to be raised.

A pressure supplying pump is illustrated herein at 30 driven by an electric motor 31 on the chassis of the vehicle. The admission of pressure fluid to the tower to extend it or the discharge therefrom to allow gravity to lower the tower is controlled by suitable valve mechanism in a casing 33 shown as resting on a tank 34 for the liquid. This valve is controlled by a telescopic rod 35 extending downwardly from the tower and having a rock arm 36 (Fig. 4) connected by a link 37 to a piston-valve 38 in the casing 33. A suitable handle 39 accessible on the worker's platform allows this valve to be turned on or off as desired.

The parts just described are given merely as illustrative of any hydraulically operated extensible tower carried by the vehicle.

Coming now to the portion of the tower vehicle with which my invention is particularly concerned, this invention provides a pair of hydraulic jacks having cylinders 40 secured to opposite sides of the vehicle in the transverse vertical plane of the tower.

The cylinder 40 of each jack has a transverse head 41 rigidly secured to it, as by welding. Rising from this head are the parallel plates 42 which may be welded to the head and which constitute in effect a bifurcated bracket. This bracket embraces an ear 43 rigidly secured to the lowermost tower tube 20 and projecting outwardly therefrom. A pin 44 attaches the bracket to the ear. Near its lower end the cylinder 40 is embraced by a strap 45 which has a rigid arm welded to the tower tube 20. The cylinder 40 is thus rigidly held to the frame and stationary members of the tower in the transverse vertical plane of the tower but preferably in a slightly outwardly inclined position, as shown in Figs. 1 and 2.

Each jack cylinder 40 contains within it a slidable plunger 50. This plunger carries at its lower end a downwardly extending projection 51 which for the most part is spherical. This spherical head seats in a spherical cavity in a foot plate 53 which extends laterally for a substantial area and is adapted to engage the ground with a firm footing.

The plunger 50 carries at its upper end a head 55 which slidably engages the interior of the cylinder 40. It is convenient to make the plunger in the form of a tube, and in that case the head 55 extends across the upper end and closes the tube. The spherical member 51 may have a shank extending into the lower end of the tube and secured by a cross pin 56. The lower portion of the plunger is guided within a bushing 57 secured within the cylinder 40. I have shown the bushing removably held in the cylinder by a U-shaped spring snap clip 58 passing through slots in the cylinder wall into the bushing.

Within the cylinder and surrounding the plunger is a helical spring 60, the lower end of which is seated on the bushing 57 and the upper end of which engages the underside of the plunger head 55. The spring, therefore, normally maintains the plunger elevated in idle position, as shown in Fig. 2. A suitable sleeve 59 on the plunger within the spring definitely holds the spring in the outermost portion of the annular region between the cylinder and the plunger.

To make a fluid-tight connection between the plunger and cylinder I provide a suitable packing 62 in the plunger head 55 engaging the interior surface of a cylinder. This packing may readily be an elastic O-ring mounted in an annular groove in the head. I also prefer to provide a packing between the bushing 57 and the plunger. As shown this comprises an elastic O-ring 63 occupying an inwardly facing groove in the bushing and engaging the plunger surface.

The removable holding of the bushing 57 in the cylinder by the snap clip 58, heretofore mentioned, enables convenient assemblage of the parts and also their ready separation whenever it is desired to replace a worn packing or change the spring.

To force the plunger downwardly, I provide a passageway 65 in the head 41 of the cylinder, this passageway discharging downwardly against the plunger head 55. A nipple 66 at the entrance to the passageway enables the connection of a conduit 67 for pressure fluid. 68 indicates a movable bleeder screw normally closing an exit to the atmosphere from the passageway.

The conduits 67 from the two cylinders 40 lead to a chamber in the upper portion of the general valve casing 33, as indicated in Fig. 5. A separate chamber in the lower portion of this casing contains the valve 38 heretofore mentioned for controlling the raising of the tower. The admission of pressure fluid to the jack cylinders 40 is controlled by a valve piston 70 in the separate chamber in the upper portion of the casing 33. As shown in Fig. 5, this plunger is connected by a link 71 with an intermediately pivoted hand lever 72. This lever is readily accessible at one side of the vehicle and when operated may shift the valve piston 70 to force downwardly the plunger of either jack or both of them.

Normally, the valve piston 70 stands without pressure fluid in either jack cylinder, so that the springs maintain the jack plungers in elevated or idle position. In use, the lever 72 is operated to shift the plunger 70 in the direction to admit pressure fluid to that jack which is on the lower side of the standing vehicle. Such fluid then pushes that jack plunger downwardly until that side of the vehicle has been lifted sufficiently to make the tower practically vertical. The valve is then left in this position during the operations by the workers on the tower platform. When the platform has been lowered and it is desired to resume travel, the lever 72 is actuated to release the pressure fluid from the lowered jack, allowing its spring to raise it to idle position.

Referring to the diagram, Fig. 6, the pump 30 draws liquid via a conduit 75 from a tank 34. This passageway from the tank to the pump is preferably through a suitable sediment separator. From the pump the conduit 77 leads to both of the valve chambers for controlling the column and the jack. From the jack chamber the conduit 78 returns to the tank. Hence when the jack valve 70 is placed to connect the conduit 77 with either of the conduits 67 the corresponding jack is lowered. When the valve 70 holds the pressure fluid in such conduit or conduits 67 the lowered jack or jacks are retained in the lowered position. When the valve 70 is shifted to connect the conduit or conduits 67 with the return passageway 78 to the tank the fluid is freed from the jack cylinders and the springs lift the jack plungers to idle position.

As a safety precaution I may provide controllable check valves, indicated at 80 in the diagram, on the two conduits 67. Such check valves operate to retain positively any pressure liquid injected into the cylinder 40 until the check valve is manually released as it may be by turning the handle indicated at 81.

For the sake of completeness I will explain the conduit connections for controlling the two column assemblies. From the column control valve, a conduit 90 leads through a normally-spring-seated pilot-operated check valve 91 to conduits 92 which lead to the bottom of the two column assemblies. When the valve 38 connects the conduit 77 with the conduit 90, the pressure fluid may be admitted to the pilot-operated check valve and unseat its valve member and pass to the lower portion of the columns, via the conduits 92, to extend the tower. Thereafter, the check valve holds the tower in any extended position.

When it is desired to lower the tower the column control valve is shifted to connect the pressure fluid in the conduit 77 to a conduit 93 which operates the pilot of the pilot-operated check valve to release the check valve and thus allow the pressure liquid to flow back from the tower to the conduits 92 and 90 and the conduit 78 back to the tank, as gravity lowers the tower.

It will be understood from the description above given that I have provided a tower vehicle, having hydraulic means for extending the tower, with hydraulic means for leveling the vehicle so that the tower may be vertical notwithstanding inclined surface of the supporting ground. Furthermore, I utilize the same reservoir for liquid and the same power-operated pump for putting it under pressure for operating both the tower raising mechanism and the jack extending mechanism. The control of the two jacks is readily effected by the operator standing on the ground at the side of the vehicle. Safety means are readily provided preventing inadvertent release of the jacks if for any reason the hydraulic pumping operation should fail.

It should be noticed particularly that my jacks are directly attached to and supported by the tower itself. Hence, they are not only effectively positioned for holding the tower vertical, but may readily be marketed with the towers for mounting on existing vehicles. The jacks are of simple construction and their feature of ready disassemblage allows convenient changing of the packing whenever required.

I claim:

1. The combination of an extensible tower adapted to be mounted on a roadway vehicle frame, said tower including a pair of upright cylinders each adapted to be secured to said frame and project above and below a member thereof, and a pair of jacks for leveling the frame, each comprising a cylinder having its upper portion pivotally connected to one of the tower cylinders above the adjacent vehicle frame member, means for connecting its lower portion rigidly to said tower cylinder below said vehicle frame member, and each jack cylinder containing a footed element projectible therefrom into engagement with the ground.

2. The combination of an extensible tower adapted to be mounted on a roadway vehicle frame having a platform, said tower including a pair of upright cylinders adapted to be secured to said frame and project above and below said platform, and a pair of jacks for leveling the frame, each comprising a cylinder having its upper portion pivotally connected to one of the tower cylinders above the platform, means for connecting its lower portion rigidly to said tower cylinder below the platform, and each jack cylinder containing a footed element projectible therefrom into engagement with the ground.

References Cited in the file of this patent

UNITED STATES PATENTS

| | | |
|---|---|---|
| 445,720 | Smitter et al. | Feb. 3, 1891 |
| 1,136,604 | L'Heureux | Apr. 20, 1915 |
| 1,149,114 | Carlock | Aug. 3, 1915 |
| 1,531,982 | Sago | Mar. 31, 1925 |
| 1,917,011 | Bird | July 4, 1933 |
| 2,080,711 | Haraldson | May 18, 1937 |
| 2,151,057 | Suth | Mar. 21, 1939 |
| 2,402,579 | Ross | June 25, 1946 |
| 2,473,757 | Long | June 21, 1949 |